Jan. 30, 1968     T. M. COLYARD ETAL     3,366,252
WORK POSITIONING DEVICE

Filed June 7, 1966     2 Sheets-Sheet 1

INVENTORS,
THOMAS M. COLYARD
STIRLING W. RAUSCHER
WALTER J. WARDEN
BY
ATTORNEYS

Jan. 30, 1968  T. M. COLYARD ETAL  3,366,252
WORK POSITIONING DEVICE

Filed June 7, 1966  2 Sheets-Sheet 2

INVENTORS,
THOMAS M. COLYARD
STIRLING W. RAUSHER
WALTER J. WARDEN

ATTORNEYS

United States Patent Office 3,366,252
Patented Jan. 30, 1968

3,366,252
WORK POSITIONING DEVICE
Thomas M. Colyard, Belmar, Stirling W. Rauscher, Belford, and Walter J. Warden, W. Long Branch, N.J., assignors to the United States of America as represented by the Secretary of the Army
Filed June 7, 1966, Ser. No. 556,818
3 Claims. (Cl. 214—1)

The present invention relates to a work positioning device and is particularly concerned with a system of control mechanisms and operations to provide for a uniform cycle of operation whether in the initial, intermediate or final stage of completion of an object worked upon.

The system and device of the present invention is in general applicable for use in providing the proper timing sequence for various cooperating instrumentalities.

A primary object of the present invention is the provision of a work or object positioning device so devised that all points on the periphery of said object do, during each revolution of the object, pass a fixed point at or away from the object in such manner that each successive point on the periphery of the object is equidistant from the fixed point.

An important feature of the invention resides in that all points on the periphery of the object do, during each revolution of the object, travel at a constant velocity in relation.

Other features and advantages of the invention will be apparent from the detailed description that follows.

The invention is exemplified in this application as applied to the flame welding of a glass bulb to the glass base, or header, of the glass enclosures used with quartz resonators or the like.

The invention can best be understood from the following description to be read in conjunction with the accompanying drawings. In said drawings, which show for illustrative purposes only, a preferred form of the invention:

Figure 1:
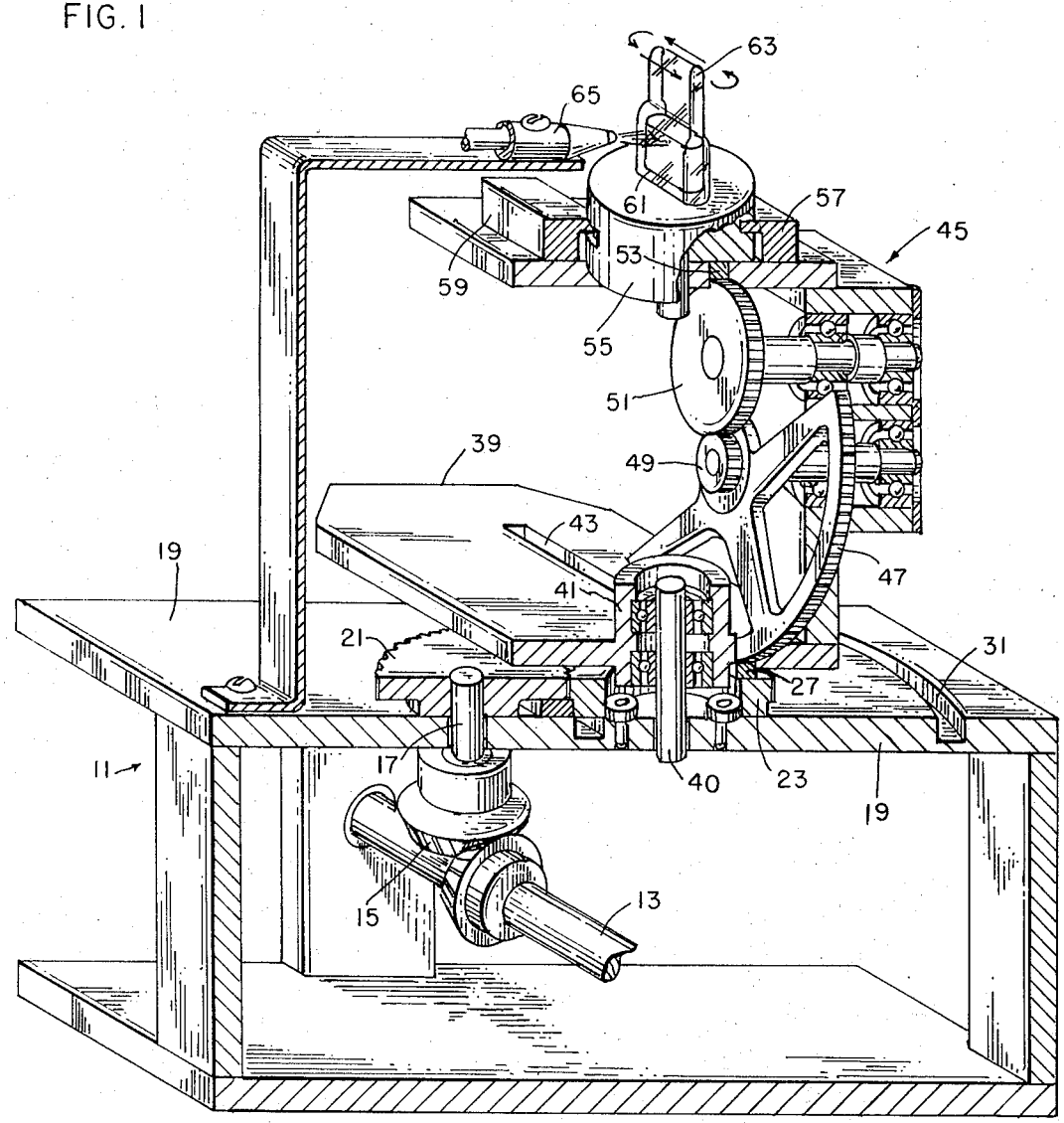
FIG. 1 is a perspective view of the machine, with certain elements broken away and in section, in order to reveal the relationship of the parts.
Figure 2:
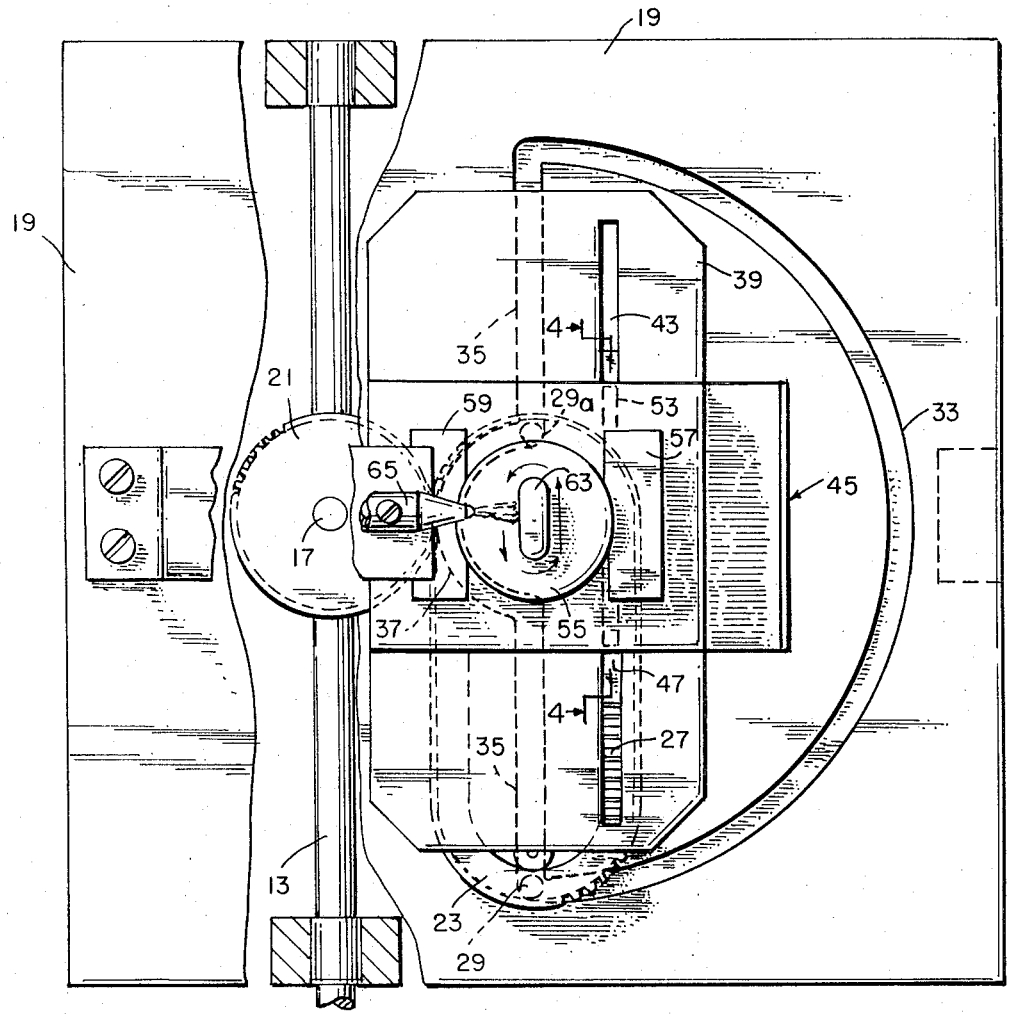
FIG. 2 is a plan view of the device, partly broken away.
Figure 3:
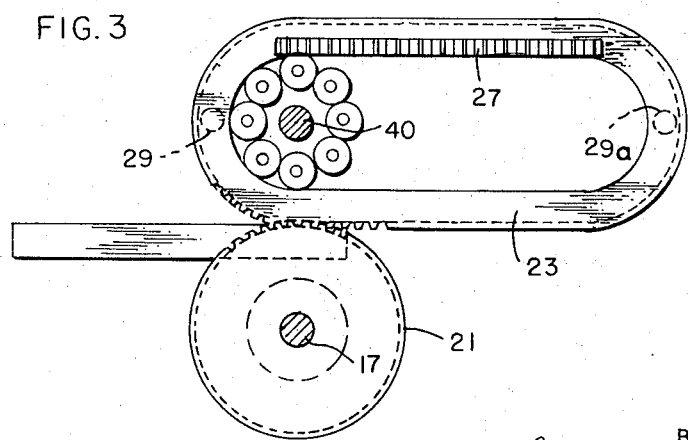
FIG. 3 is a detailed view of the special racetrack gear and its driving member.
Figure 4:
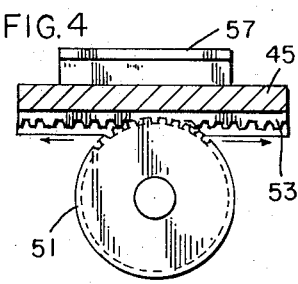
FIG. 4 is a section taken on the line 4—4 of FIG. 2.

Referring to the drawings, there is shown in FIG. 1 a framework 11 within which the operating components of the work positioning and supporting device are contained. For the mechanical operation of the device there is provided a power drive shaft 13 operated from a power source not shown. The drive shaft 13 is provided with a bevel gear 15 which serves to drive a shaft 17 and is positioned perpendicular to the drive shaft 13 extending through a fixed base 19. The drive shaft 17 operates a drive gear 21. The drive gear 21 meshes with a uniquely shaped drive gear 23, which is free to move in a controlled path and the configuration of which can best be seen in FIG. 3. As shown in FIG. 3 the gear 23 is substantially elliptical in shape assuming a racetrack configuration, and for purposes of clarity to distinguish it from the many other gears in the device, will be hereinafter designated as racetrack gear 23. It is further noted that the racetrack gear 23 is free to float in the flat base 19 of the framework 11. The same gear is further provided with a straight section of gear rack 27, affixed to the top face or surface thereof and parallel to the straight sections of the racetrack gear. The same racetrack gear is also provided with a pair of guide pins 29, 29A each of which are separately secured to the underside of the respective keystone segments of the arcuate ends of the racetrack gear 23 and which are adapted to ride in a grooved track 31 in the base plate 25. The general configuration of the track 31, which is of critical importance to this invention, is shown in FIG. 2 and, as can be seen, includes a 180° arcuate portion 33 and a non-continuous straight-away portion 35 which includes a medial 180° arcuate portion 37 which has an internal diameter just slightly larger than the external diameter of an arcuate end of the racetrack gear 23.

Very slightly spaced from the racetrack gear 23 is a rectangular rotatable plate 39 carried by a bearing 41 and so devised so as to rotate in common with the racetrack gear 23 by means of shaft 40 common to both the racetrack gear and the plate 39. The plate 39 is so aligned, relative to the racetrack gear 23, that its elongated edges are in substantial parallel relationship with the straight edges of the racetrack gear as can be seen in FIG. 2. The plate 39 further includes an elongated slot 43 spaced from one of the elongated edges of the plate and in parallel alignment therewith.

Affixed to one edge of the rotatable plate 39, and rotatable therewith is a turret assembly generally designated as 45. Supported by the turret 45 is a segment gear 47 which is adapted to mesh, through the slot 43, with the rack gear 27 on the racetrack gear 23. The segment gear 47 is pivotally mounted on a shaft as shown. A gear train including the gears 49, 51 transfers movement of the segment gear at a reduced ratio to a short rack gear 53 affixed to the underside of a holding member 55 which is slidably mounted between rails 57, 59. The aforesaid assembly is affixed to the turret 45.

For the accomplishment of the specific embodiment of the invention there is provided a mount 61 upon which can be positioned a rectangular shaped glass bulb 63 that is to be worked upon. In this instance there is shown a means for flame-sealing the separate portions of the glass bulb. To accomplish this, there is shown a gas jet 65 rigidly supported on the base 19. Not shown are the tubing for supplying gas to the gas jet 65.

The operation of the work positioning device heretofore described can be briefly set forth as follows. The separate component parts of the glass bulb 63 are placed upon the mount 61. The drive 13 is energized to effect rotation of the drive gear 13 which in turn acts upon racetrack gear 23 to effect rotation thereof. Since the racetrack gear 23 and plate 39 coact through the common shaft 40, the plate 39 will rotate along with racetrack gear. At the same time segment gear 47 will be urged into movement through its meshed engagement with the gear rack 27 of the racetrack gear 23. Movement of the segment gear will be translated through its associated reduction gear arrangement to the rack gear 53 on the underside of the holding member 55.

In FIG. 2 there is depicted the manner in which the racetrack gear 23 is caused to rotate 180° which action is transferred to the holding member as heretofore described. The guide pin 29 is caused to enter arcuate portion 37 of track 33 effecting pivoting movement of the gear 23. At the time of the 180° rotation, the segment gear 47 and rack gear 27 are in mesh but not in relative movement with respect to each other. When the straight-away portion of the gear 23 is reached, the entire assembly is driven linearly.

From the foregoing description of the invention, it will be evident to those skilled in the art that various changes and modifications may be made without departing from its spirit or scope.

What is claimed is:

1. A work positioning device comprising a framework that includes a fixed base having a grooved track therein, said track having a substantially semi-circular configuration and having an 180° outwardly disposed arcuation portion intermediate the linear side thereof, a first drive gear that is in meshed driving engagement with a substantially elliptical shaped gear free to travel over said fixed base and provided with discrete guide pins at the underside of the respective keystone portions of the arcuate ends of said ellipitical gear that are adapted to travel in said grooved track and further provided with a rack gear on the topside thereof that is in parallel alignment with its elongated sides, a substantially rectangular plate spaced slightly above said elliptical gear and mutually rotatable therewith, said plate having an elongated slot that superposes the rack gear on said ellipitcal gear, a turret assembly affixed to said rectangular plate and rotatable therewith, said turret assembly including a segment gear that meshes with the rack gear of said elliptical gear through the slot of said plate, a movable holding member adapted to support the device to be worked upon, said holding member having a rack gear on its underside in meshing engagement with said segment gear whereby the movement and travel path of said elliptical gear is translated to said holding member.

2. A device of the kind set forth in claim 1 and further including a shaft that is common to said rectangular plate and said elliptical gear whereby mutual rotation of both of said components is effected.

3. A device of the kind set forth in claim 1 and further including gear reduction means between said segment gear and the rack gear of said holding member.

References Cited

UNITED STATES PATENTS 2,376,540   5/1945   Iden _____ 214—1

GERALD M. FORLENZA, *Primary Examiner.*

F. E. WERNER, *Assistant Examiner.*